(12) United States Patent
Barton et al.

(10) Patent No.: US 6,389,923 B1
(45) Date of Patent: May 21, 2002

(54) LENGTH-ADJUSTABLE SHAFT FOR A VEHICLE STEERING COLUMN ASSEMBLY

(75) Inventors: Laurence George Herbert Barton; James Peter Bentley, both of Warwickshire (GB)

(73) Assignee: NSK Steering Systems Europe Limited, Nottinghamshire (GB)

( * ) Notice: Subject to any disclaimer, the term of this patent is extended or adjusted under 35 U.S.C. 154(b) by 0 days.

(21) Appl. No.: 09/401,047

(22) Filed: Sep. 22, 1999

(30) Foreign Application Priority Data

Sep. 23, 1998 (GB) ............................................. 9820762

(51) Int. Cl.⁷ ................................................. B62D 1/16
(52) U.S. Cl. ........................................ 74/492; 280/777
(58) Field of Search ..................... 74/492, 493; 280/777

(56) References Cited

U.S. PATENT DOCUMENTS

| | | | |
|---|---|---|---|
| 4,667,530 A | 5/1987 | Mettler et al. | ................. 74/493 |
| 5,152,627 A | * 10/1992 | Arnold | ........................ 403/109 |
| 5,243,874 A | 9/1993 | Wolfe et al. | ................... 74/493 |
| 5,348,345 A | * 9/1994 | Dykema et al. | ............. 280/777 |
| 5,383,811 A | 1/1995 | Campbell et al. | ............. 464/89 |
| 5,509,324 A | * 4/1996 | Cymbal | ....................... 74/492 |
| 5,722,300 A | 3/1998 | Burkhard et al. | ............. 74/493 |
| 5,758,545 A | 6/1998 | Fevre et al. | .................. 74/493 |

FOREIGN PATENT DOCUMENTS

| | | |
|---|---|---|
| GB | 2 205 149 A | 11/1988 |
| GB | 2 253 024 A | 8/1992 |

* cited by examiner

Primary Examiner—David Fenstermacher
(74) Attorney, Agent, or Firm—Miles & Stockbridge P.C.

(57) ABSTRACT

A length-adjustable shaft for a vehicle steering column assembly includes an inner column member mounted in an outer column member, the two column members being relatively slidable to allow axial adjustment of the steering column. A bush is mounted with a sliding fit on the inner member inside the outer member, the bush being fixed within the outer member by means of adhesive injected through fill holes provided in the outer steering column member. The inner member has a stop near its free end to prevent removal of the bush from the inner member.

13 Claims, 1 Drawing Sheet

LENGTH-ADJUSTABLE SHAFT FOR A VEHICLE STEERING COLUMN ASSEMBLY

BACKGROUND OF THE INVENTION

This invention relates to vehicle steering column assemblies and more particularly to length-adjustable shafts for use in such adjustable steering column assemblies.

Steering column assemblies which are adjustable axially (reach adjustable) normally include an inner steering column member mounted in an outer steering column member, the two column members being relatively slidable to allow for the axial adjustment. Normally, the inner and outer steering column members are of non-circular cross section to transmit torque between them, and a triangular configuration is common. To inhibit vibration between the two members, it is common to mount a bush between them, so that one can slide relatively to the other. It is common practice for the bush to be pressed on, or to be permanently fixed by staking or by other means on the inner steering column member. The combination of the bush and inner steering column member is then designed, by close tolerance between the outer form of the bush and the inner form of the outer steering column member, to slide, thus allowing the required axial adjustment.

Problems associated with this are that the outer steering column member, which is tubular in the region of the bush, must be parallel over a length sufficient to cover the length of the bush and also the length of the axial adjustment stroke. All three components, therefore, have to be accurately controlled for dimensional tolerance, which is costly, especially for components with non-circular cross sections, and, in addition, there will always be a clearance required for manufacturing tolerances. This will result in a potential backlash and "chuckle", i.e. axial rock of the inner column member in the outer.

The foregoing illustrates limitations known to exist in present telescopic shafts for use in adjustable steering columns. Thus, it would be advantageous to provide an alternative directed to overcoming one or more of the limitations set forth above. Accordingly, a suitable alternative is provided including features more fully disclosed hereinafter.

SUMMARY OF THE INVENTION

In one aspect of the present invention, this is accomplished by providing a vehicle steering column assembly comprising an inner column member mounted in an outer column member, the two column members being relatively slidable to allow axial adjustment of the steering column; and a bush mounted with a sliding fit on the inner member inside the outer member, said bush being fixed within said outer member.

The foregoing and other aspects will become apparent from the following detailed description of the invention when considered in conjunction with the accompanying drawings.

DETAILED DESCRIPTION

Figure 1:
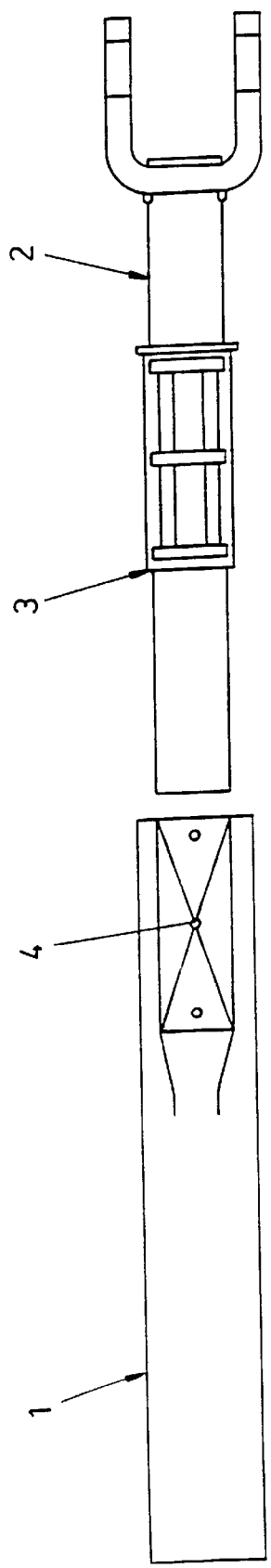
FIG. 1 is a schematic side view of components of a vehicle steering column prior to assembly.

The drawings show a shaft for a vehicle steering column assembly including an outer steering column member 1, an inner steering column member 2, and a bush 3 slidably mounted with an interference fit on the inner steering column member 2. In the form illustrated, the inner and outer members 1 and 2 are triangular tubes and the bush 3 is a plastics molded part with good inherent tolerances to have a good sliding fit on the inner triangular tube 2. To prevent the bush 3 from being removed from the tube 2, the free end of the tube 2 is provided with a stop such as by peening.

Figure 2:
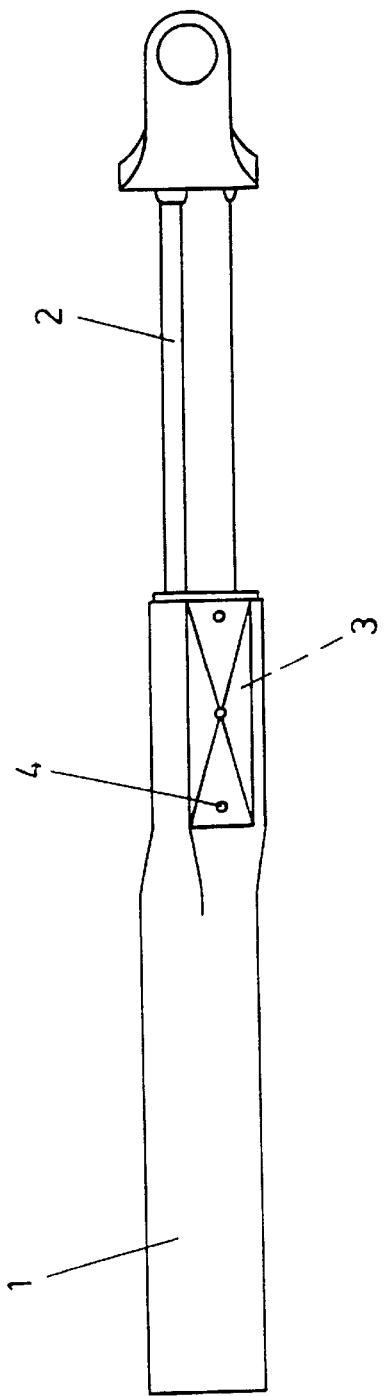
FIG. 2 is a schematic side view of the components shown in FIG. 1 after assembly.

The tube 2 with its bush 3 assembled thereon is then inserted in the outer tube 1 until the bush 3 lies wholly within the tube 1 as shown in FIG. 2. Holes 4 are provided through the wall of the outer tube 1 in the region over the inserted bush 3, these holes 4 acting as fill holes for adhesive, which is injected through the fill holes to retain the bush 3 securely within the outer tube 1. The adhesive is preferably a cold adhesive.

When the adhesive has cured, the bush is fixed within the outer member, but the inner tube 2 can slide freely within the bush 3; and, since the bush 3 has always a light interference on the inner tube 2, there is no free play in the system, the comparatively thin wall of the bush 3 taking the shape of the inner tube 2. No additional pressure is provided by the bonding process of the bush 3 and outer tube 1 during injection of the adhesive nor during the curing thereof. Also, the bore of the outer tube 1 does not need to be machined to have a close tolerance with the bush 3, since the adhesive fills any gaps between the bush and the outer tube member.

To summarize, lash defects are eliminated from adjustable steering columns by the unique features of the invention. Preferably, the bush is secured within the outer steering column member by the adhesive which is injected through fill holes in the outer steering column member. Removal of the bush from the inner steering column member is prevented by a stop provided near the free end of the steering column member. The outer steering column member has an inner non-circular profile, and the inner steering column member, which may be a tube or shaft, has a matching outer non-circular profile. The inner steering column member can be extruded. The bush can be a plastics molded part arranged to have a good sliding fit with light interference on the inner steering column member. The adhesive which is injected between the outer member and the bush takes-up any slack between them, thereby permitting fabrication of the outer member and the bush to ordinary manufacturing tolerances.

Having described the invention, what is claimed is:

1. A length-adjustable shaft for a vehicle steering column assembly, comprising:

an inner steering column member mounted in an outer steering column member, the two column members being relatively slidable to allow axial adjustment of the steering column; and a bush mounted with a sliding fit on the inner member inside the outer member, said bush being fixed within said outer member by adhesive bonding.

2. The length-adjustable shaft of claim 1, wherein the bush is secured within the outer steering column member by a cold adhesive.

3. The length-adjustable shaft of claim 2, wherein the adhesive has been injected through fill holes provided in the outer steering column member.

4. The length-adjustable shaft of claim 1, wherein the inner steering column member includes a stop to prevent removal of the bush from the inner steering column member, said stop being provided in a region of an end of the inner steering column member received by the outer steering column member.

5. The length-adjustable shaft of claim 1, wherein the outer steering column member has an inner non-circular profile and the inner steering column member has an outer non-circular profile.

6. The length-adjustable shaft of claim 5, wherein the non-circular profiles are triangular.

7. The length-adjustable shaft of claim 1, wherein the bush is a plastics molded part arranged to have a sliding fit with interference on the inner steering column member.

8. The length-adjustable shaft of claim 1, wherein the inner steering column member is an extruded tube.

9. A length-adjustable shaft for a vehicle steering column assembly, comprising:

an inner steering column member mounted in an outer steering column member, the two column members being relatively slidable to allow axial adjustment of the steering column; and a bush mounted with a sliding fit on the inner member inside the outer member, said bush being fixed within said outer member by adhesive which has been injected through fill holes provided in the outer member.

10. The length-adjustable shaft of claim 9, wherein the inner steering column member includes a stop to prevent removal of the bush from said inner steering column member, said stop being provided in a region of an end of the inner steering column member received by tho outer steering column member.

11. The length adjustable shaft of claim 9, wherein the outer steering column member has an inner non-circular profile and the inner steering column member has an outer non-circular profile.

12. The length adjustable shaft of claim 11, wherein the non-circular profiles are triangular.

13. The length-adjustable shaft of claim 9, wherein the bush is a plastics molded part arranged to have a sliding fit with interference on the inner steering column member.

* * * * *